United States Patent Office 3,177,238
Patented Apr. 6, 1965

3,177,238
PRODUCTION OF R-OXY SILICON OXIDES
Jacobus Rinse, 77 Anderson Road, Bernardsville, N.J.
No Drawing. Filed Sept. 26, 1961, Ser. No. 140,678
4 Claims. (Cl. 260—448.8)

This invention relates to compounds which may be described as regular (or symmetric) space tetrameric R-oxy silicon oxides and the production thereof.

This application is a continuation-in-part of my co-pending application Serial No. 19,490, filed April 4, 1960, now U.S. Patents No. 3,087,949, granted April 30, 1963, and Serial No. 65,930, filed October 31, 1960.

Processes for the production of simple alkoxides of various metals and silicon and their linear polymers are described in the literature. To varying degrees, the compounds are unstable, for they unavoidably hydrolyze readily under ordinary conditions of use. This property renders these compounds of limited utility especially where water or moisture is present.

Space polymers definable as tetra R-oxy, tetrasilicon hexoxides (R being a hydrocarbon) have been produced by the instant inventor and have been found to possess good solubility in organic solvents and certain of them possess high surface activity. They possess excellent compatability with many other organic and inorganic materials and frequently impart highly desirable properties to the resulting compositions.

Thus it is a primary object of the present invention to provide a new series of R-oxy silicon oxides possessing new properties making them of practical utility in a number of fields.

It is another important object of the invention to provide methods of producing the novel space polymers which are practical in operation; employing easily available, or producible, raw materials, using simple operations and providing high yields without appreciable loss of by-products.

Other objects, features and advantages of the invention will become apparent from the more detailed description which follows:

The compounds of the invention may be considered to be space monomers and polymers having the formula:

$$(Si_4O_6(OR)_4)_n$$

where $n$ is an integer and R is a hydrocarbon or a substituted hydrocarbon derived from a hydroxy hydrocarbon in which the hydroxy group is the only functional group in the reactions described below. The compounds have one, and only one, alkoxy or like oxy-group attached to the silicon atom. The compounds in which $n=1$ or 2 or 3 constitute a special class of compounds for the compounds in which $n=2$ and $n=3$ are mere aged products of the compounds in which $n=1$. It will be understood that $Si_4O_6(OR)_4$ is in a sense a tetrameric compound having the formula $(SiO_{1.5}(OR))_4$. Thus when $n=1$, 2 and 3, respectively, in the above formula the resulting compounds are referred to herein as tetrameric, octameric and dodecameric space polymers.

Repeated runs of the processes described below coupled with quantitative determinations of yield followed by molecular weight determinations revealed the novel structure of the compounds of the invention. In these runs, the amount stoichiometrically calculated to produce the new compounds were mixed and reacted, and the yields obtained of the new compounds and of the by-products were substantially the theoretically obtainable amounts. These results coupled with the conformance of the determined molecular weights (using the cryoscopic method) with the theoretical molecular weights evidence the fact that the nucleus of the tetrameric molecules is in the shape of a tetrahedron in which the silicon atoms occupy the apexes and are joined along the sides to each other through three oxygen atoms there being four R-oxy groups attached to the nucleus, one to each silicon atom.

The octameric polymers of the invention may be formed simply by aging the tetrameric polymers hereinbefore described, as for twenty-four hours or more. Freshly prepared products revealing a molecular weight indicating there were only four silicon atoms to the molecule later revealed double molecular weights on subsequent tests made after storage, showing a change to eight silicon atoms to the molecule. Alkylated octameric silicon oxide compounds described in the prior art are stated to be hexahedric or cubic in structure and the octameric compounds of the instant invention probably have the same structure rather than that of associated compounds made up of two tetrameric molecules.

The tetrameric and octameric compounds may be considered to constitute space polymers having the following structure.

Space molecules 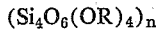

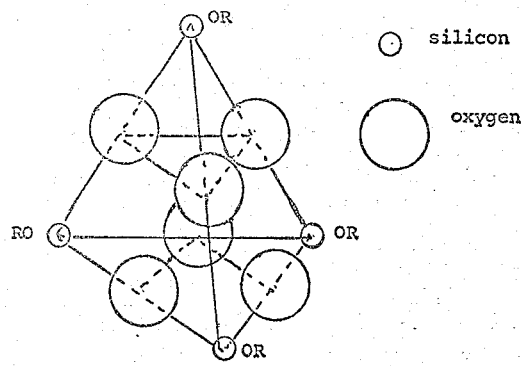

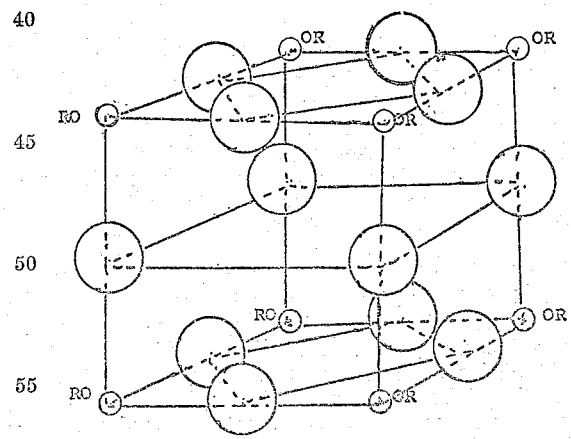

Hexahedric structure of octamer
Distances between spheres have been enlarged to show location of atoms. Actually they are closely packed.

The oxygen atoms may not be exactly on the sides of the tetrahedron or the hexahedron but may be close to them in a plane with the adjoining silicon atoms.

For producing the space tetrameric R-oxy silicon oxides under one embodiment of the present invention, a silicon alcoholate derived from an alcohol volatilizable from the reaction product is mixed and reacted with water in the mol ratio of substantially exactly 1:1.5. The application of heat to the reaction mass at a level which causes vaporization of the alcohol being liberated, as at 60° to 80° C., facilitates the initial and intermediate stages of the reaction, but liberation of alcohol ceases at these temperatures before the space tetrameric structure is attained. To produce these polymers, the reaction mass is heated at a temperature of 100° C., or somewhat more, and for producing some of the tetramers, the reaction is effected at a temperature of 130°–200° C. or higher to cause the reaction to go to completion. For reaching this completed stage, the heating is continued at the high level, generally for an hour or more, until three mols of alcohol have been liberated per mol alcoholate and advantageously vaporized off, the removal being assisted by a vacuum, if required or desired. The product can be defined by the formula:

$$Si_4O_6(OR)_4$$

The reaction may be visualized as follows:

$$4Si(OR)_4 + 6H_2O \rightarrow Si_4O_6(OR)_4 + 12ROH$$

The silicon alkoxides used in the production of the compounds of the instant invention are preferably derived from lower molecular alcohols. The alcohols must be of sufficiently high volatility that when their radicals are liberated and reform as alcohols in the process by reaction of the alkoxides with water, they may be removed by distillation. Alcohols of suitable volatility are propanol, butanol and pentanol and the corresponding iso-alcohols and secondary alcohols. Alkoxides of higher molecular alcohols or of mixtures of high and lower alcohols can be employed under same conditions, the alkoxides of higher alcohols having up to 10 carbon atoms being operable. In actual practice, alkoxides of isopropanol and butanol have the advantages of low cost and low boiling point.

Tetrameric silicon oxide R-oxides where R is a hydrocarbon radical of a hydroxy hydrocarbon of lower volatility than the alcohol of the ortho-silicate can be produced by introducing at least one mol of the higher molecular hydroxy hydrocarbon along with the one and one-half mols of water into the one mol of the silicon alkoxide of the lower molecular alcohol and reacting under the same or substantially the same conditions. Here four mols instead of three mols of the lower alcohol are liberated.

The reaction may be visualized as follows:

$$4Si(OR')_4 + 4ROH + 6H_2O \rightarrow Si_4O_6(OR)_4 + 16R'OH$$

Any hydroxy hydrocarbon of a higher boiling point than the alcohol corresponding to the alkoxide used can be employed. In addition to the aliphatic alcohols hereinbefore specifically referred to, there may be mentioned the aromatic hydroxides as phenol, the cresols and other alkylated phenols of 1–18 carbon atoms in the side chain which provide a phenoxy silicon oxide, furfuryl and allyl alcohols and hydroxy hydrocarbons substituted with functional groups inactive in the process, e.g., allyl and acrylic alcohols. There also may be mentioned high molecular aliphatic alcohols including those having up to 20 carbon atoms or more and they may be cyclic or straight chained, primary or secondary, unsubstituted or substituted with atoms or radicals inactive in the process, examples being lauryl, cetyl, stearyl, oleyl, linoleyl, hexyl, ethylhexyl and cyclohexyl alcohols.

In accordance with a second embodiment of the invention, the space tetrameric R-oxy, silicon oxides hereinbefore described are produced from a tetrachloride or other tetrahalogenide of silicon by mixing and reacting the silicon chloride with water in the mol ratio of substantially 1:1.5 and with at least one mol of an hydroxy hydrocarbon, preferably a lower molecular alcohol, in the presence of a reagent which will take up and bind the hydrogen chloride liberated by the reaction.

The reaction can be efficiently carried out by slowly adding the water and the alcohol to the silicon chloride in solution or dispersion form in an inert solvent such as one of the hydrocarbons hereinbefore mentioned, and during this addition, also introducing ammonia. The reaction to an intermediate stage proceeds with or without heat. Ammonium chloride precipitates as the reaction proceeds and upon completion of this step, the solid salt formed is preferably separated from the liquid reaction product. Thereupon the latter is heated to and at a temperature in excess of 100° C. until the condensation is complete, i.e., the space tetramer or other polymer has been formed. This final heating is advantageously carried out under vacuum to remove excess or residual alcohol or any organic solvent used. Four mols of the chloride salt are formed for each mol of the silicon chloride used.

Instead of ammonia, other hydrogen halide binders can be employed, such as triethyl amine or other organic amine, or less economically, sodium or potassium ethylate or other alcoholate. The liquid binders can be introduced into the reaction with the alcohol-water mixture. The amount of the acid binder used should be substantially equivalent to the chloride, or other halide, present. Any excess produces side reaction products in the reaction mass.

In an alternative procedure, the space tetrameric R-oxy, silicon oxides may be formed by adding the silicon chloride to cooled alcohol while simultaneously adding the ammonia or amine or other binding agent and subsequently adding the water in the stated quantity during continuation of the agitation. The precipitate formed is removed and the silicon reaction product is heated, as before, at a temperature above 100° C. under vacuum until the condensation is complete. Again the product is $Si_4O_6(OR)_4$ or a polymer thereof.

In accordance with a special aspect of this invention, it has been found that the presence of a small amount of a titanium alcoholate, i.e., $Ti(OR)_4$, typically lower titanium alcoholates of low molecular weight alcohols, promotes alcoholysis of the lower R-oxy silicon oxides to form higher R-oxy silicon oxides.

In accordance with another special embodiment of this invention, it has been found small amounts of like titanium alcoholates, say of the order of 1%, convert films of liquid silicon oxide alkoxides into solid films of superior quality. Due to the small amount of titanium alcoholate used, it is apparent it functions catalytically.

The following purely illustrative examples will further facilitate an understanding of the invention.

*Example 1*

Twenty-seven grams of water and 120 ml. of mixed alcohols, mostly primary amyl alcohol, together with 60 ml. of isopropyl alcohol were mixed with 208 g. of ethyl silicate, $Si(OC_2H_5)_4$, followed by the addition of 0.5 ml. of hydrogen chloride. The resulting mixture was refluxed for four hours after which the reaction was continued until the temperature reached 100° C., the volatile products being permitted to vaporize off. Next the reaction mass was heated under reflux for another 1.5 hours and thereupon the mass was heated at 160° C. under vacuum until the alcohol ceased to come off. The yield of the product was 137,5 g. (calculated 139 g.). It was a clear viscous liquid soluble in hydrocarbons and in alkyd resin solutions. The silicone content of the product was 19.9% which compares with the calculated silicone content of 20.1% contained in $Si_4O_6(OC_5H_{11})_4$.

In this process, the amyl alcohol mixture can be replaced by equivalent amounts of phenol or of cyclohexanol and the corresponding phenoxy and cyclohexanoxy compounds obtained.

*Example 2*

One hundred seventy grams of silicon tetrachloride is added to 500 g. of isopropanol maintained at 0° C. under agitation. Simultaneously a stream of dry ammonia vapor is introduced into the reaction mass, thereby taking up the liberated hydrochloric acid. Excess ammonia is avoided to prevent side reactions. The mixture is kept slightly acidic. When all silicon chloride has been added, the temperature is raised to 30° C. and the ammonium chloride formed is removed by filtration. Next, 27 g. of water diluted with 100 g. isopropanol is added and the batch is heated under reflux for 5 hours. Then isopropanol is removed by distillation, finally at 150° C. under vacuum. The yield obtained was 100 gr. of a clear liquid consisting of $Si_4O_6(OC_3H_7)_4$.

Upon substituting equivalent amounts of n-butanol, or other butanols, in the process of this example, the corresponding liquid butoxy silicon oxide, $Si_4O_6(OC_4H_9)_4$, is obtained.

*Example 3*

Two hundred eight grams tetraethylsilicate is poured under agitation in a mixture of 27 gr. water, 0.2 gr. HCl and 100 gr. enthanol. The batch is heated under reflux for 16 hours. Then alcohol is distilled off and at 150° C. Vacuum is applied until distillation ends. The yield is 96.5 gr. (calculated 97 gr.) tetraethoxy tetrasilicon hexoxide or more succinctly silicon-oxide-ethoxide. The product is a clear liquid with a specific gravity at 20° C. of 1.31.

*Example 4*

Two hundred eight grams tetraethylsilicate is poured under agitation into a mixture of 108 gr. paracresol dissolved in 200 gr. isopropanol and 27 gr. water and 0.5 gr. HCl. The batch is heated under reflux for 24 hours and then alcohol is removed by distillation. Temperature rises to 150° C. Then vacuum is applied and distillation continued til no more alcohol distillate comes over. The yield of cresoxy silicon hexoxide is 155 gr. (calculated 158 gr.). It is a red brown oil which solidifies over night at room temperature.

*Example 5*

One hundred seventy grams silicon tetrachloride is mixed with 500 gr. hexane and cooled to 10° C. Then a solution of 200 gr. ethanol, 404 gr. triethylamine and 27 gr. water is added slowly. The batch is refluxed for two hours and filtered under vacuum. The filtrate is evaporated to dryness and yielded a clear viscous oil which appeared to be identical with the product of Example 3.

*Example 6*

One hundred seventy grams silicon tetrachloride dissolved in 200 gr. hexane is slowly added to a cold mixture of 300 gr. isopropanol and 27 gr. water. Simultaneously ammonia is bubbled through the batch. More hexane is added and temperature is raised to reflux during 4 hours. After filtration, the liquid is heated and the residue is analyzed. Its silicon content 25.0% corresponded to that for silicon oxide isopropoxide (25.2% Si).

*Example 7*

One hundred twenty-five grams silicon oxide butoxide (made as in Example 1) is dissolved in 100 gr. xylene and mixed with 260 gr. stearyl alcohol, and 4 gr. titanium tetraisopropoxide. After 5 hours heating at reflux temperature, the solvents are removed by distillation, finally under a vacuum. The product silicon oxide stearoxide weighs 305 gr. (calculated 311 gr.) and is a solid with melting point of 48° C. Its composition is that of silicon oxide stearate, $Si_4O_6(OC_{18}H_{37})_4$.

*Example 8*

Upon adding 1% titanium butoxide to silicon oxide butoxide and spreading the liquid in a thin layer, exposed to the air, it was found that in 60 minutes a clear tack-free layer was obtained with a loss in weight of 10%. The same product without the catalyst did not dry in the air for longer than 7 days.

The new silicon oils, in particular the butoxides, are characterized by high surface activity and by excellent compatibility with alcohols, aliphatic and aromatic hydrocarbons, naphthenate base mineral oils, etc. They dissolve in alkyd resins when heated at 80° C. and react with the hydroxyl groups of the alkyd resins when heated for a short period of time at 160–180° C. These siliconated alkyd resins dry faster and with higher gloss than the original alkyds.

The solutions of certain of the R-oxy silicon oxides in mineral oils have an improved viscosity index.

Metal powders, i.e., aluminum and zinc dust, when mixed with a new silicon oil and a trace (½–1%) or titanium alcoholate, dry to a tack-free coating which can stand very high temperatures (700–800° C.) for unlimited periods.

Alkylsiloxanes volatilize at high temperatures while our symmetric alkoxy siloxanes, $((RO)_4Si_4O_6)_n$, are not volatile, but continue to condense on heating, leaving finally a residue of silica ($SiO_2$).

The reaction of ethylsilicate with water in molar-ratio 1:1.5 also can be done in two steps provided no more and no less than 1.5 mol of water is used in both stages combined. It is possible to start with condensed ethylsilicate and to add the calculated amount of water and a trace of HCl. The final product is the same as from ethylsilicate.

Instead of using water to supply the oxygen atoms for joining the silicon atoms in the space tetramers, or their polymers, produced from the silicon chlorides, it is possible to use sodium or other alkali hydroxide (in an amount equivalent to the water replaced) with either complete or a partial elimination of the use of the hydrogen chloride binder. The reaction of the silicon chloride, sodium hydroxide and alcohol in the mol ratio of 4:6:4 leads to the tetrasilicon-hexoxy-tetralkoxide, sodium chloride and hydrogen chloride in the mol ratio of 1:6:10. Thus the sodium hydroxide, like the water, supplies the oxygen and at the same time takes up part of the chlorine liberated from the silicon chloride atoms.

The molecules of the space tetramers, or at least some of them, produced by the present invention have a tendency on aging to associate and form weakly bound octamers or higher polymers.

It should be understood that the present invention is not limited to the details herein set out, but that it extends to all similar raw materials, procedures and conditions which will occur to those skilled in the art upon consideration of the general tenor of the specification and the scope of the claims appended hereto.

What is claimed is:
1. Process for the preparation of polymeric R-oxy-silicon oxide space tetramers of the formula:

$$Si_4O_6(OR)_4$$

where one and only one RO— is attached to each silicon atom which comprises, mixing together and reacting (*a*) an $Si(X)_4$ compound wherein X is selected from the group consisting of chlorine and a radical forming a silicon alcoholate the alcohol of which is volatilizable from the silicon product formed, with (*b*) water in the mol ratio of substantially exactly 1:1.5 in the presence of an hydroxy hydrocarbon containing only OH as a functional group and up to 20 carbon atoms at a temperature at which and until liberation of HX ceases, said temperature being finally at a level at least as high as 100° C. and the amount of HX liberated being 4 and 3–4 mols respectively in relation to the silicon chloride and silicon alcoholate used.

2. Process for the preparation of R-oxy silicon oxide space polymers of the formula:

$$(Si_4O_6(OR)_4)_n$$

where *n* is an integer and R is a hydrocarbon radical which comprises, mixing and reacting an Si (alcoholate)$_4$ the alcohol of which is volatilizable from the silicon product formed, with water in the mol ratio of substantially exactly 1:1.5 at a final temperature at least as high as 100° C. until 3 mols of alcohol per mol of the silicon compound have been liberated by the reaction and vaporized off.

3. Process for the preparation of polymeric R-oxy silicon oxide space tetramers of the formula:

$$Si_4O_6(OR)_4$$

where R is a hydrocarbon radical which comprises, mixing and reacting $Si(Cl)_4$ with water in the mol ratio of substantially exactly 1:1.5 and with an alcohol containing only OH as a functional group and up to 20 carbon atoms in the presence of a hydrochloric acid binder until 4 mols of HCl per mol of the silicon chloride have been liberated and taken upon by the binder, and finally heating the reaction mass at a temperature at least as high as 100° C. until the space tetramer is formed.

4. Process for the preparation of R-oxy silicon oxide space polymer of the basic formula:

$$Si_4O_6(OR)_4$$

where one and only one RO— is attached to each silicon atom which comprises, mixing and reacting a $Si(alcoholate)_4$, the alcohol of which is volatilizable from the silicon product formed, with water in the mol ratio of substantially exactly 1:1.5 and with an hydroxy hydrocarbon containing only OH as a functional group, up to 20 carbon atoms, and having a higher boiling point than the alcohol of the alcoholate used at a final temperature as high as 100° C. until 3–4 mols of alcohol have been liberated by the reaction and vaporized off, thereby forming the space polymer in which the R radicals are at least in part derived from the added hydroxy hydrocarbon.

References Cited in the file of this patent
UNITED STATES PATENTS

| | | |
|---|---|---|
| 2,465,188 | Barry et al. | Mar. 22, 1949 |
| 2,566,956 | Pedlow et al. | Sept. 4, 1951 |
| 2,660,538 | Emblem et al. | Nov. 24, 1953 |
| 2,820,806 | Haslam | Jan. 21, 1958 |
| 2,848,425 | Olson et al. | Aug. 19, 1958 |
| 2,917,467 | Olson et al. | Dec. 15, 1959 |
| 3,027,394 | Pierce et al. | Mar. 27, 1962 |
| 3,087,949 | Rinse | Apr. 30, 1963 |

OTHER REFERENCES

Wiberg et al.: "Zeitschrift für Anorganische and Allegemeine Chemie," volume 282 (1955), pages 330–44.

Sprung et al.: "Jour. Am., Chem. Society," volume 77, August 1955, pages 3990–4002.